UNITED STATES PATENT OFFICE.

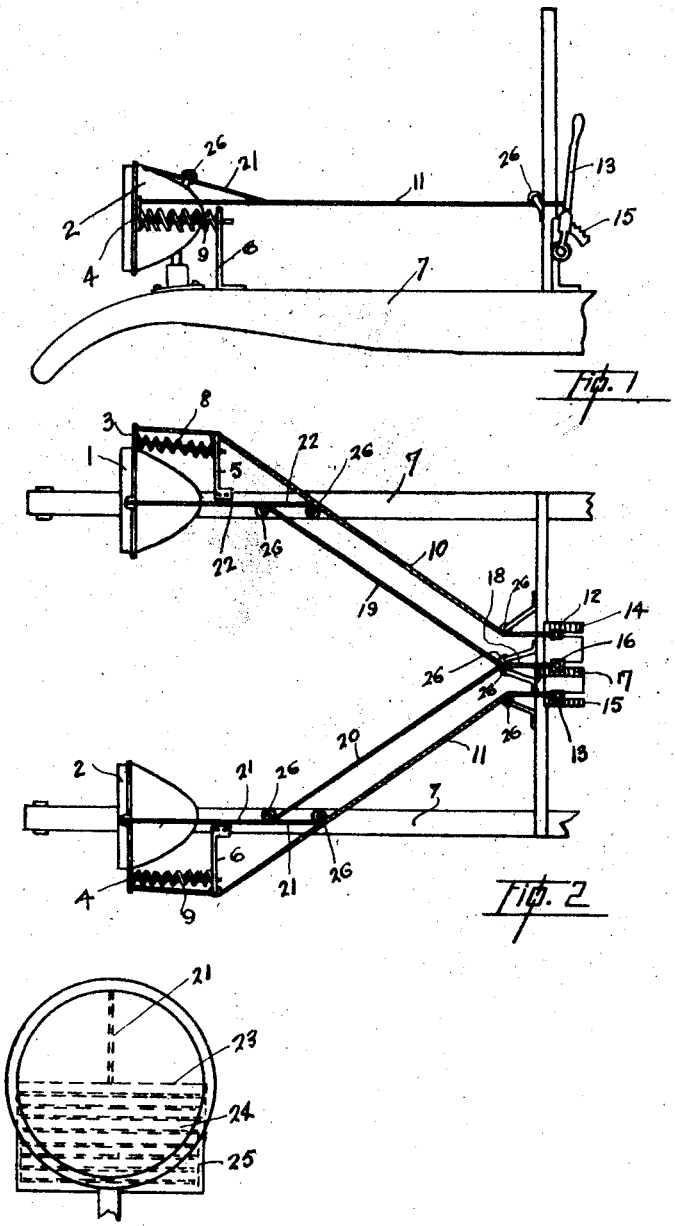

GEORGE DAVIDSON, OF LADYSMITH, BRITISH COLUMBIA, CANADA.

DIRECTION INDICATOR FOR AUTOMOBILES.

1,411,324. Specification of Letters Patent. Patented Apr. 4, 1922.

Application filed September 8, 1921. Serial No. 499,245.

*To all whom it may concern:*

Be it known that I, GEORGE DAVIDSON, a subject of the King of Great Britain, and a resident of Ladysmith, in the Province of British Columbia, Canada, have invented certain new and useful Improvements in Direction Indicators for Automobiles, of which the following is a specification.

My invention relates to improvements in direction indicators for automobiles and other moving vehicles and the object of my invention is to provide a device of this character which can be readily and easily applied to an automobile for manipulation by the driver to indicate the direction of travel of the car, either straight ahead, or to the right or left, as the case may be, thereby enabling observers to determine the course of the car and thus avoiding accident.

I attain this object by the means illustrated in the accompanying drawings in which—

Fig. 1 is a side view illustrating the practical application of the invention.

Fig. 2 is a plan view.

Fig. 3 is a face view of a lamp.

Similar figures of reference indicate similar parts throughout the several views.

In carrying out the invention the headlights 1 and 2 are mounted for partial rotation, the right hand side lamp 1 being capable of swinging movement towards the right hand and the left hand side lamp 2 towards the left, and each lamp is provided on its outer side with a lug, 3 and 4 respectively, between which lugs 3 and 4 and brackets 5 and 6 secured to the chassis 7 are disposed springs 8 and 9 respectively, these springs serving to maintain the lamps in their straight ahead position, as shown by the full lines in Fig. 2. Secured to each lamp on its outer side are flexible cables 10 and 11 the opposite ends of which are connected to hand levers 12 and 13 suitably fulcrumed at their lower ends and arranged so as to be within easy reach of the driver, and these levers cooperate with notched quadrants 14 and 15 so that they may be held in any position to which they may be moved, being fitted with any well known pawl or plunger device adapted to co-act with the quadrant notches to hold the lever in its adjusted position and which requires no description. 16 and 17 indicate respectively a similar lever and co-acting quadrant to which lever is connected one end of a flexible cable 18, which cable is divided into two branches 19 and 20 the ends of which are connected to flexible cables 21 and 22 intermediate the length of the same. These cables 21 and 22 are connected at one end to the cables 10 and 11 while their opposite ends are led within the lamps 1 and 2 to normally depend from the upper edge of each lamp, being connected to the upper end of a Venetian blind shutter construction lying normally closed at the bottom of the lamp adjacent the glass thereof, which construction is indicated generally by the numeral 23 and the dotted lines in Fig. 3, and the slats 24 of which are of red glass. The casing of the lamp may, of course, be modified to contain the slats 24, as indicated at 25, in Fig. 3.

The manner in which the device is used may be briefly described. To indicate that the car is proceeding straight ahead without turning the driver pulls lever 16 thus pulling on the cable 18, the branches 19 and 20, and cables 21 and 22 raising the red glass blind 23 in each lamp so that each lamp appears as if it were a red lamp, thus indicating a straight ahead direction.

When turning to the right the driver pulls lever 12, thus pulling cable 10 and swinging the lamp 1 round towards the right, cable 22 being also pulled at the same time, since it is connected to cable 10, and thus lamp 1 only appears as a red lamp and points in the direction the car is going to turn. In the same way when turning to the left the driver pulls lever 13, thus pulling cable 11 and swinging lamp 2 around to the left, cable 21 being pulled also at the same time, since it is connected to cable 11, and thus lamp 2 only appears as a red light and points in the direction the car is going to turn.

On releasing levers 12 or 13, as the case may be, the springs 8 and 9 return the respective lamps to their normal positions.

It will be understood, of course, that the flexible cables may be carried in any desired direction and supported by suitably mounted sheaves, as indicated at 26 in Fig. 2.

What I claim as my invention is:—

1. In a direction indicator for moving vehicles, the combination with the vehicle headlights, of a coloured shutter within each headlight disposed normally out of sight, means for raising said shutters whereby the headlights appear the colour of the shutters, and means for swinging the right hand headlight to the right or the left hand to the left simultaneously with the raising of the right or left hand shutters respectively.

2. In a direction indicator for moving vehicles, the combination with the vehicle headlights, of a coloured shutter within each headlight disposed normally out of sight, means for raising said shutters whereby the headlights appear the colour of the shutters, means for swinging the right hand headlight to the right or the left hand to the left simultaneously with the raising of the right or left hand shutters respectively, and means for returning the headlights to their normal positions.

3. In a direction indicator for moving vehicles, the combination with the vehicle headlights, of a coloured shutter within each headlight disposed normally out of sight, means for raising said shutters whereby the headlights appear the colour of the shutter, means for swinging the right hand headlight to the right and the left hand to the left simultaneously with the raising of the right and left hand shutters respectively, and means for temporarily maintaining said shutter in its raised position and the headlight in its swung position.

4. A direction indicator for moving vehicles comprising right and left hand headlights capable of being swung outwardly respectively to the right and left, a shutter within each headlight formed of coloured transparent connected slats normally collapsed one on the other out of sight, flexible cables connected at one end to the upper slat of each shutter their opposite ends being connected to a lever the operation of which pulls the cables to raise the shutters, a flexible cable for each headlight connected at one end to the headlight and at the opposite end to a lever the operation of which swings its respective headlight outwardly, and a flexible connection between each headlight cable and the shutter cables.

5. A direction indicator for moving vehicles comprising right and left hand headlights capable of being swung outwardly respectively to the right and left, a shutter within each headlight formed of coloured transparent connected slats normally collapsed one on the other out of sight, flexible cables connected at one end to the upper slat of each shutter their opposite ends being connected to a lever the operation of which pulls the cable to raise the shutters, a flexible cable for each headlight connected at one end to the headlight and at the opposite end to a lever the operation of which swings its respective headlight outwardly, a flexible connection between each headlight cable and each shutter cable, and a spring for ach headlight compressed by the outward swinging movement of the headlight operative to return the headlight to its normal position when the respective cable is freed from the pull.

Dated at Ladysmith, B. C., this 15th day of August, 1921.

GEORGE DAVIDSON.